United States Patent [19]

Polanski et al.

[11] 4,424,673

[45] Jan. 10, 1984

[54] HYDRAULIC SUPPLY SYSTEM OF A PULSATORY PRESS

[75] Inventors: Zbigniew Polanski; Ryszard Moszumanski, both of Cracow, Poland

[73] Assignee: Politechnika Krakowska, Cracow, Poland

[21] Appl. No.: 218,804

[22] Filed: Dec. 22, 1980

[51] Int. Cl.[3] .............................................. F16D 31/02

[52] U.S. Cl. ........................................ 60/486; 60/494; 60/469

[58] Field of Search .................. 60/486, 494, 469, 387

[56] References Cited

U.S. PATENT DOCUMENTS

| | | | |
|---|---|---|---|
| 3,018,628 | 1/1962 | Pomper | 60/486 X |
| 3,530,668 | 9/1970 | Siebens | 60/469 X |
| 4,023,466 | 5/1977 | Strassheimer | 60/486 X |
| 4,167,893 | 9/1979 | Johnson | 60/494 X |
| 4,198,820 | 4/1980 | Roth | 60/387 |

*Primary Examiner*—Harold W. Weakley

*Attorney, Agent, or Firm*—Ladas & Parry

[57] ABSTRACT

A hydraulic supply system of a pulsatory press has two pumps (4 and 5) supplying through non-return valves (8 and 9) and through overflow valves (10 and 11), two slide dividers (17 and 19). The divider (17) in the position I directs oil to the working space $V_n$ under the servo-motor piston, whereas the divider (19) directs oil to the rotary divider (20) wherefrom a pulsating stream of oil gets into the working space under the part of the piston of a smaller diameter and into the run-off. The divider (17) in the position II directs oil to the space $V_p$ over the servo-motor piston at a simultaneous connection of the space $V_w$ via a slide valve (24) with the run-off, whereby the value of pressure in the space $V_p$ over the servo-motor piston is limited by means of an overflow valve (15).

The conduit supplying oil from the divider (19) to a rotary divider (20) is connected via a cut-off valve (22) and a throttle valve (23) with a conduit supplying oil from the divider (17) to the space $V_n$ under the piston of the servo-motor.

2 Claims, 3 Drawing Figures

HYDRAULIC SUPPLY SYSTEM OF A PULSATORY PRESS

Figure 1:
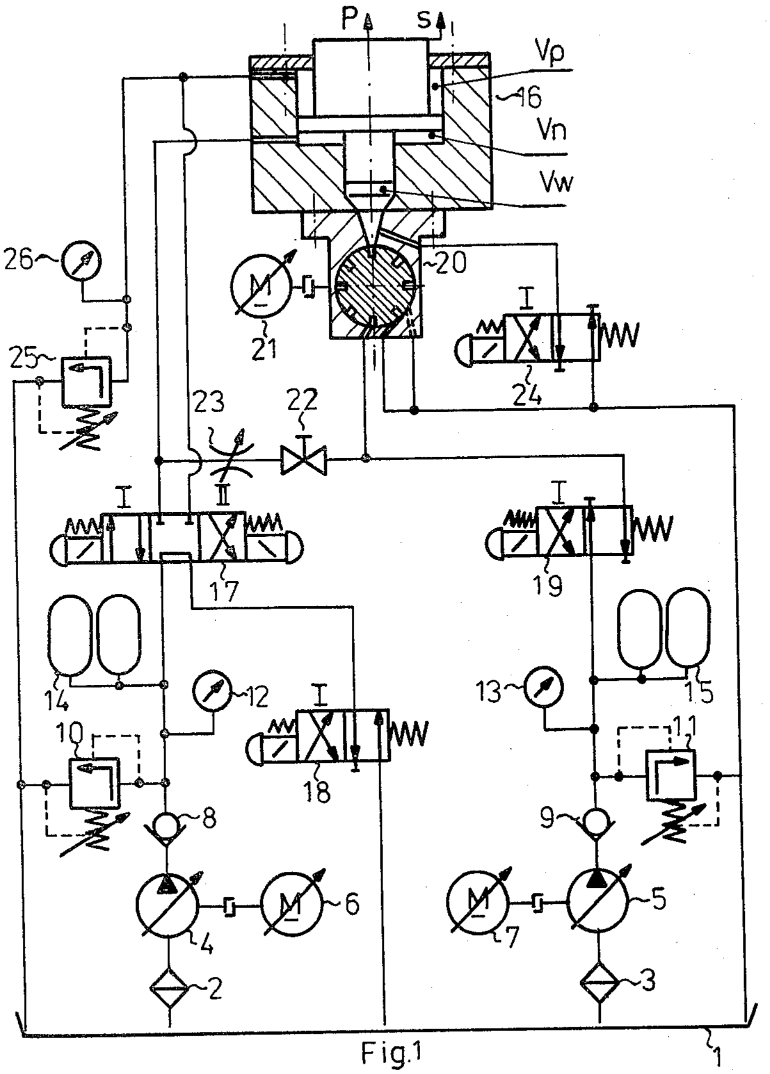

The subject of the invention is a hydraulic supply system of a pulsatory press, especially of presses for vibratory plastic forming.

There is known a hydraulic supply system of pulsatory machines and equipment including a pump with a safety-valve, which feeds oil through a slide divider or another control element to working spaces of servo-motors of pulsatory plates.

Pulsatory fluctuations of pressure in working spaces of servo-motors of pulsatory plates are caused at the application of a pulse valve as opening of said valve under the effect of a pressure increase causes bleeding of oil from working spaces into a run-off and an abrupt pressure drop in the working spaces of servo-motors. A constant value of the pressure force is secured by an application of a pressure accumulator connected via a valve and a safety valve with the space under pistons of the servo-motors of the lower plate.

The above described system is known from the U.S.S.R. invention specification No. 364378.

There is known a hydraulic supply system of a double-action hydraulic press including a two-stage sliding-vane pump feeding oil through a non-return valve and a safety valve to two electromagnetically controlled slide dividers from which oil is supplied to the space under the piston of a servo-motor and to a hydraulic intensifier. On the supply conduit of the servo-motor a contact manometer is installed which controls the slide dividers at obtaining of a required pressure, which causes—after obtaining of the required pressure—feeding of oil to the over-piston space of the servo-motor and opening of the under-piston space to the run-off. As a result the piston of the servo-motor displaces downwards according to the set amplitude of pulsation until a signal of repeating the cycle is fed by a limit switch. Supply of the servo-motor of the concentric punch with the piston of the servo-motor and of the piston situated in the hollowing is carried out by means of a separate hydraulic pump together with the equipment and the control system. Said system is known from the U.S.S.R. patent specification No. 183709. In the known hydraulic supply systems of pulsatory presses generation of a pulsatory stream of a liquid is carried out in large spaces, which requires an application of pumps of high deliveries, hinders stabilizing of the parameters of the vibration force and causes an unfavourable energy balance.

The essence of the invention consists in that in the hydraulic supply system of the pulsatory press including pumps, non-return overflow valves, safety valves, pressure accumulators and slide dividers there are two pumps applied which are protected by means of non-return valves and are connected with overflow valves and pressure accumulators, said pumps pressing oil to slide dividers. One of the slide dividers in the on-position I directs oil to the working space under the piston of the hydraulic servo-motor whereas the second slide divider in the on-position I feeds oil to a rotary divider from which oil in a form of a pulsating stream gets into the working space under the part of the servo-motor piston of a smaller diameter and into the run-off. The first slide divider in the on-position II directs oil to the working space over the servo-motor piston at simultaneous connecting of the working space under the piston of the smaller diameter with the run-off via a slide valve. The value of the pressure in the space over the piston of the hydraulic servo-motor is limited by an overflow valve. The conduit supplying oil from the slide divider to the rotary divider is connected via a cut-off valve and a throttle valve with the conduit supplying oil from the slide divider to the space under the piston of the hydraulic servo-motor.

The hydraulic supply system according to the invention renders it possible to carry into effect two schemes of pulsatory load at a utilization of generally available elements of force hydraulics. The system according to the invention enables fluent control of parameters of the process within a full range from values close to zero to nominal values. The system according to the invention is characterized by reliability, easy operation and high watt-hour efficiency.

Figure 2:
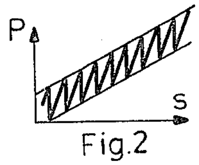
Figure 3:
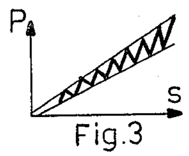

The hydraulic supply system of a pulsatory press according to the invention is presented in an example of its realisation in the attached drawing wherein FIG. 1 shows a diagram of the supply system, FIG. 2 shows a diagram of pulsatory load at closed cut-off valve, FIG. 3 shows a diagram of pulsatory load at the cut-off valve opened.

The hydraulic supply system of the pulsatory press includes an oil tank 1 from which via filters 2 and 3 oil is fed to two multi-piston pumps 4 and 5 of variable delivery which are driven by direct-current motors 6 and 7 with infinitely variable adjustment of the frequency of rotation. A change of the delivery of pumps 4 and 5 and the frequency of rotation of motors 6 and 7 driving the pumps enables a change of the speed of the working motion of the press in a continuous manner and within a wide range. Both pumps 4 and 5 are protected by means of non-return valves 8 and 9. Values of pressures in the branches of the system supplied by pumps 4 and 5 are limited by means of overflow valves 10 and 11 and are indicated by means of manometers 12 and 13. The pressure conduits of pumps 4 and 5 are connected with pressure accumulators 14 and 15 designed for stabilizing of pressure and for supplying of bigger amounts of oil during periods of a sudden requirement in working spaces of the servo-motor 16. The servo-motor 16 is provided with a piston of two working surfaces. When slide dividers 17 and 18 are in the working position I oil is fed to the working pulsating pressure generator $V_n$ under the piston of the hydraulic servo-motor 16. At a simultaneous setting of the slide divider 19 in the working position I oil is fed by the pump 5 to a rotary pulsating pressure generator 20, and therefrom it gets into the pulsating pressure chamber $V_w$ under the part of the servo-motor piston of a smaller diameter and partly into the run-off to the tank 1. The rotor of the rotary pulsating pressure generator 20 is driven by a direct-current motor 21 with infinitely variable adjustment of the frequency of rotation. If a cut-off valve 22 at the conduit connecting the conduit supplying the chamber $V_n$ under the piston of the hydraulic servo-motor 16 and the conduit supplying the rotary pulsating pressure generator 20 are closed, then both branches of the supply system which are supplied by pumps 4 and 5 operate independently and the load scheme is realised in which at an increasing mean value of the force a simultaneous increase of the amplitude of the pulsation of the force occurs (proportional function). Proportions of forces are set by means of the throttle valve. The return motion of the piston of the hydraulic servo-motor 16 is realised after setting of the slide divider 17 in the working position II and after setting of the slide valve 24 connecting the chamber $V_w$ under the part of the servo-motor piston of the smaller diameter in the working position I. Then oil is fed from the pump 4 to the chamber $V_p$ over the piston of the hydraulic servo-motor 16, whereas the chamber $V_n$ under the piston of the servo-motor 16 and the chamber $V_w$ under the part of the piston of the smaller diameter are connected with the run-off to the tank 1. The value of pressure in the chamber $V_p$ over the piston of the hydraulic servo-motor 16 is limited by means of the overflow valve 25 and indicated by the manometer 26.

What is claimed is:

1. A hydraulic operating system for a pulsatory press comprising:

(a) a servo motor with a piston having two interconnected parts, one piston part being of larger diameter and having a working stroke pressure chamber thereunder and a return stroke pressure chamber thereabove, and the other piston part being of smaller diameter and having a pulsating pressure chamber thereunder;

(b) first pumping means arranged to supply hydraulic fluid at a predetermined pressure from a tank to a first slide divider that in a position I admits fluid to the working stroke pressure chamber for a working stroke of the piston and in a position II admits fluid to a return stroke pressure chamber for a return stroke, a run-off line being provided to exhaust fluid from chamber during the piston working stroke; and (c) second pumping means arranged to supply hydraulic fluid at a predetermined pressure from a tank to a second slide divider that in the position I admits fluid to a rotary pulsating pressure generator, wherefrom it passes in a pulsating stream to the pulsating pressure chamber under the smaller diameter piston part during the working stroke of the piston, a run-off line being provided to exhaust fluid from the pulsating pressure chamber during the piston return stroke;

whereby when the first and second slide dividers are in position I the two part piston during its working stroke is subjected to the sum of the predetermined pressure in the working stroke chamber generated by first pumping means and the predetermined pulsating pressure in the pulsating stroke chamber generated by second pumping means.

2. A system according to claim 1 in which the first and second slide dividers are connected by a fluid line having a cut off valve therein, whereby when said valve is open the pressure in the pulsating pressure chamber is dependent on the pressure in the working pressure chamber to produce corresponding changes in the amplitude of the pulsating pressure.

* * * * *